(12) United States Patent
Seo et al.

(10) Patent No.: US 8,196,156 B2
(45) Date of Patent: Jun. 5, 2012

(54) OPTICAL DISC REPRODUCING APPARATUS HAVING PROTRUDING AND ROTATING DISC DRIVE

(75) Inventors: Jae Kab Seo, Suwon-si (KR); Won Youl Bae, Gwacheon-si (KR); Byeng Bae Park, Ansan-si (KR); Heyun Moon Bang, Suweon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 198 days.

(21) Appl. No.: 12/545,972

(22) Filed: Aug. 24, 2009

(65) Prior Publication Data

US 2010/0064302 A1   Mar. 11, 2010

(30) Foreign Application Priority Data

Sep. 9, 2008   (KR) .................. 10-2008-0088838

(51) Int. Cl.
    *G11B 17/04*   (2006.01)
(52) U.S. Cl. ........................ 720/647; 720/612
(58) Field of Classification Search ............. 720/646, 720/647, 652, 612
    See application file for complete search history.

(56) References Cited

U.S. PATENT DOCUMENTS

| | | | | |
|---|---|---|---|---|
| 4,561,084 A * | 12/1985 | Satake et al. | | 720/612 |
| 4,744,072 A * | 5/1988 | Tamaki et al. | | 720/612 |
| 5,016,236 A * | 5/1991 | Cho | | 720/605 |
| 5,187,700 A * | 2/1993 | Yoon | | 720/612 |
| 6,212,147 B1 * | 4/2001 | Ishihara | | 720/612 |
| 7,120,918 B2 * | 10/2006 | Yanase et al. | | 720/612 |
| 2002/0008790 A1 * | 1/2002 | Tajima | | 349/2 |
| 2005/0100366 A1 | 5/2005 | Kim et al. | | |
| 2005/0210486 A1 * | 9/2005 | Shibata et al. | | 720/652 |
| 2006/0018673 A1 | 1/2006 | Choi | | |
| 2007/0025773 A1 | 2/2007 | Tateyama et al. | | |
| 2008/0229340 A1 * | 9/2008 | Miyazaki | | 720/610 |

FOREIGN PATENT DOCUMENTS

JP   2000-076763   3/2000
JP   2001175082    6/2001

OTHER PUBLICATIONS

European Search Report issued Feb. 2, 2010 in EP Application No. 09171348.7.

* cited by examiner

*Primary Examiner* — Brian Miller
(74) *Attorney, Agent, or Firm* — Stanzione & Kim, LLP

(57) ABSTRACT

An optical disc reproducing apparatus includes a body installed at a wall or other mounting apparatus, and an optical disc drive protruding from the body such that an optical disc is inserted into the optical disc drive. The optical disc drive is rotatably installed to the body to protrude forward from the body, so that the optical disc reproducing apparatus is installed regardless of positions of a wall-mount television installed above the optical disc reproducing apparatus.

14 Claims, 8 Drawing Sheets

OPTICAL DISC REPRODUCING APPARATUS HAVING PROTRUDING AND ROTATING DISC DRIVE

CROSS-REFERENCE TO RELATED APPLICATIONS

This application claims priority under 35 USC 119 from Korean Patent Application No. 10-2008-0088838, filed on Sep. 9, 2008, in the Korean Intellectual Property Office, the disclosure of which is incorporated herein by reference.

BACKGROUND

1. Field of the General Inventive Concept

The present general inventive concept relates to an optical disc reproducing apparatus. More particularly, the present general inventive concept relates to a wall-mount type optical disc reproducing apparatus.

2. Description of the Related Art

An optical disc reproducing apparatus reads information recorded on an optical disc such as a compact disk (CD) or a digital versatile disk (DVD).

In general, such an optical disc reproducing apparatus includes an optical disc drive that reproduces information recorded on an optical disc. Further, the optical disc reproducing apparatus is connected with an audio-video (AV) appliance such as a television or a speaker to output image or sound information, which is reproduced through the optical disc drive, through the AV appliance in the form of an image or sound.

Recently, the optical disc reproducing apparatus has a characteristic of slimness to improve the design thereof, so development for the optical disc reproducing apparatus has been conducted to reduce a space occupied by the optical disc reproducing apparatus. As thickness of the optical disc reproducing apparatus has been sufficiently reduced, demands for a wall-mount type optical disc reproducing apparatus have been increased such that the space occupied by the optical disc reproducing apparatus can be reduced similarly to a wall-mount type television.

SUMMARY

Accordingly, it is an aspect of the present general inventive concept to provide a wall-mount type optical disc reproducing apparatus.

Additional aspects and/or advantages of the present general inventive concept will be set forth in part in the description which follows and, in part, will be apparent from the description, or may be learned by practice of the general inventive concept.

Embodiments of the present general inventive concept may be achieved by providing an optical disc reproducing apparatus including a body installed at a wall, and an optical disc drive rotatably installed to the body to protrude from the body.

The optical disc reproducing apparatus may further include a driving apparatus that rotates the optical disc drive. The driving apparatus may include a driving motor that generates rotational force, a driving gear rotated by the driving motor, and a cam gear installed at the body to rotate the optical disc drive while being engaged with the driving gear.

The cam gear may include a cam unit having teeth engaged with the driving gear to guide movement of the optical disc drive. The cam unit may include a movement section that extends in front and rear directions to guide linear movement of the optical disc drive, and a rotating section that extends in a form of an arc to guide rotation of the optical disc drive.

The optical disc drive may include a hinge protrusion that moves back and forth and rotates in the cam gear, and guide protrusions that guide the rotation of the optical disc drive. The cam gear may include a hinge installation hole that extends in front and rear directions and allows the hinge protrusion to move back and forth and rotate therein, and guide holes that extend from the hinge installation hole in circumferential direction to guide linear movement and circumferential movement of the guide protrusions.

The hinge installation hole and the guide holes may combine to form a continuous irregularly shaped pattern of holes.

The guide holes may have a predetermined curvature such that the guide protrusions do not rotate more than a fixed distance.

Each guide hole may include a movement guide section that extends in front and rear directions, and a rotation guide section that extends from a front end of the movement guide section in circumferential direction.

The guide protrusions may be provided at both sides of the hinge protrusion as a pair, and the guide holes are formed at front and rear sides of the hinge installation hole, respectively.

The optical disc reproducing apparatus may further include a speaker installed at the body to output sound reproduced from an optical disc.

The optical disc drive may include a drive housing forming an external appearance and the body is provided with a concave receiving section that has a shape to correspond to the drive housing to receive the optical disc drive.

The optical disc drive may include an internal frame in which internal parts are installed and the drive housing is movably installed, a guide pin installed at the drive housing to allow the drive housing to move relative to the internal frame, a guide slot provided in the internal frame to guide movement of the guide pin, and an elastic member having a first end installed at the internal frame and a second end installed at the drive housing.

Embodiments of the present general inventive concept may also be achieved by providing an optical disc reproducing apparatus including a body installed at a wall, an optical disc drive rotatably and movably installed to the body while protruding from the body such that the optical disc drive rotates after moving forward by a predetermined distance, and a driving apparatus that allows the optical disc drive to move back and forth while rotating the optical disc drive.

A part of the optical disc drive may protrude forward from the receiving section of the body before the optical disc drive is rotated.

The driving apparatus may include a driving motor that generates rotational force, a driving gear rotated by the driving motor, and a cam gear installed at the body to guide linear movement and rotation of the optical disc drive while being engaged with the driving gear.

The cam gear may include a cam unit having teeth engaged with the driving gear to guide movement of the optical disc drive and wherein the cam unit may include a movement section that may extend in front and rear directions to guide linear movement of the optical disc drive, and a rotating section that may extend in a form of an arc to guide the rotation of the optical disc drive.

The optical disc drive may include a hinge protrusion movably and rotatably installed to the cam gear, and guide protrusions that guide the linear movement and rotation of the optical disc drive, wherein the cam gear may include a hinge installation hole that extends in front and rear directions and allows the hinge protrusion to move back and forth and rotate therein, and guide holes that extend from the hinge installation hole to guide linear movement and circumferential movement of the guide protrusions.

Embodiments of the present general inventive concept may also be achieved by providing a mountable optical disc drive apparatus including a body having a front surface, a concave receiving section disposed in the front surface of the body and having a cam gear installed at a surface of the concave receiving section, and an optical disc drive rotatably coupled to the body via the concave receiving section such that the optical disc drive rotates about the body to a predetermined position.

The mountable optical disc drive apparatus may also include a cam gear having at least one movement guide section and rotation guide section, and a frame coupled to the cam gear such that the frame moves along a path of the movement guide section and the rotation guide section.

The frame may include a hinge protrusion and a plurality of guide protrusions mounted to the frame.

Embodiments of the present general inventive concept may also be achieved by providing a method of operating an optical disc drive apparatus, including mounting a body having a front surface on a wall or vertical mounting apparatus, partially protruding an optical disc drive apparatus beyond the front surface in a front direction from a concave receiving section in the body, and rotating the optical disc drive apparatus only after the optical disc drive has moved in the front direction.

The optical disc drive apparatus is rotated in a cam gear having at least one movement guide section and at least one rotation guide section.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
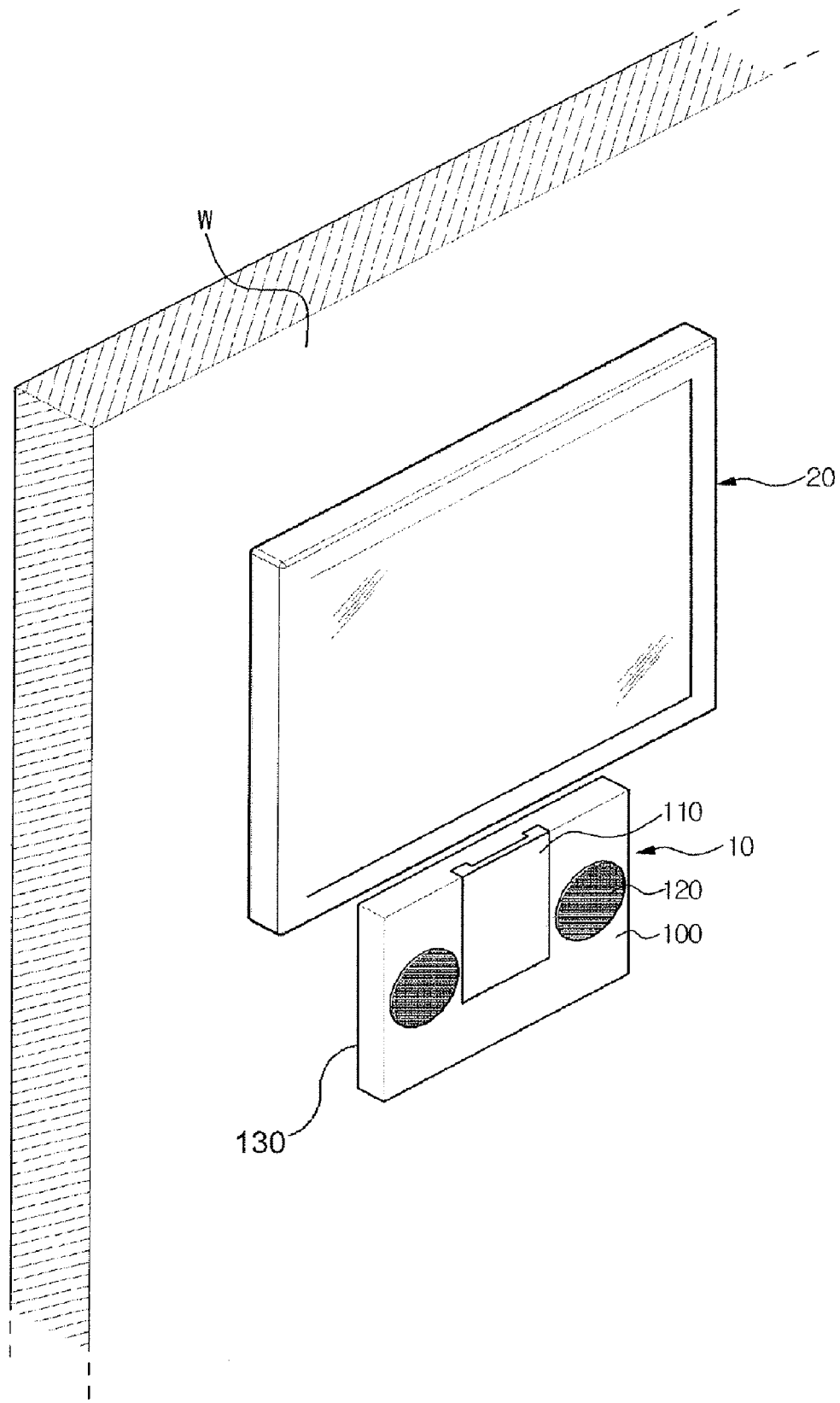
FIG. 1 is a perspective view illustrating an installation state of an optical disc reproducing apparatus according to one embodiment of the present general inventive concept.

Hereinafter, one preferred embodiment of the present general inventive concept will be described in detail with reference to accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIG. 1, an optical disc reproducing apparatus 10 according to the present embodiment may be installed below a wall-mount type television 20. The optical disc reproducing apparatus 10 may include a body 100 having a thin thickness and an optical disc drive 110. The body 100 has a rear surface 130 installed at a wall surface W of a building or other wall-type or mounting structure through a wall-mount scheme. The body may not be wall mounted, but may be a stand-alone apparatus or mounted on a pedestal type apparatus either adjacent or remote to a television or other image viewing apparatus. The optical disc drive 110 may be operated to protrude from the front center of the body 100 so that an optical disc D may be inserted into the optical disc drive 110. The optical disc reproduction apparatus 10 may also be an optical disc recorder, a dual reproduction/recorder apparatus, or a DVD burner type apparatus for use with a personal or laptop computer.

Figure 3:
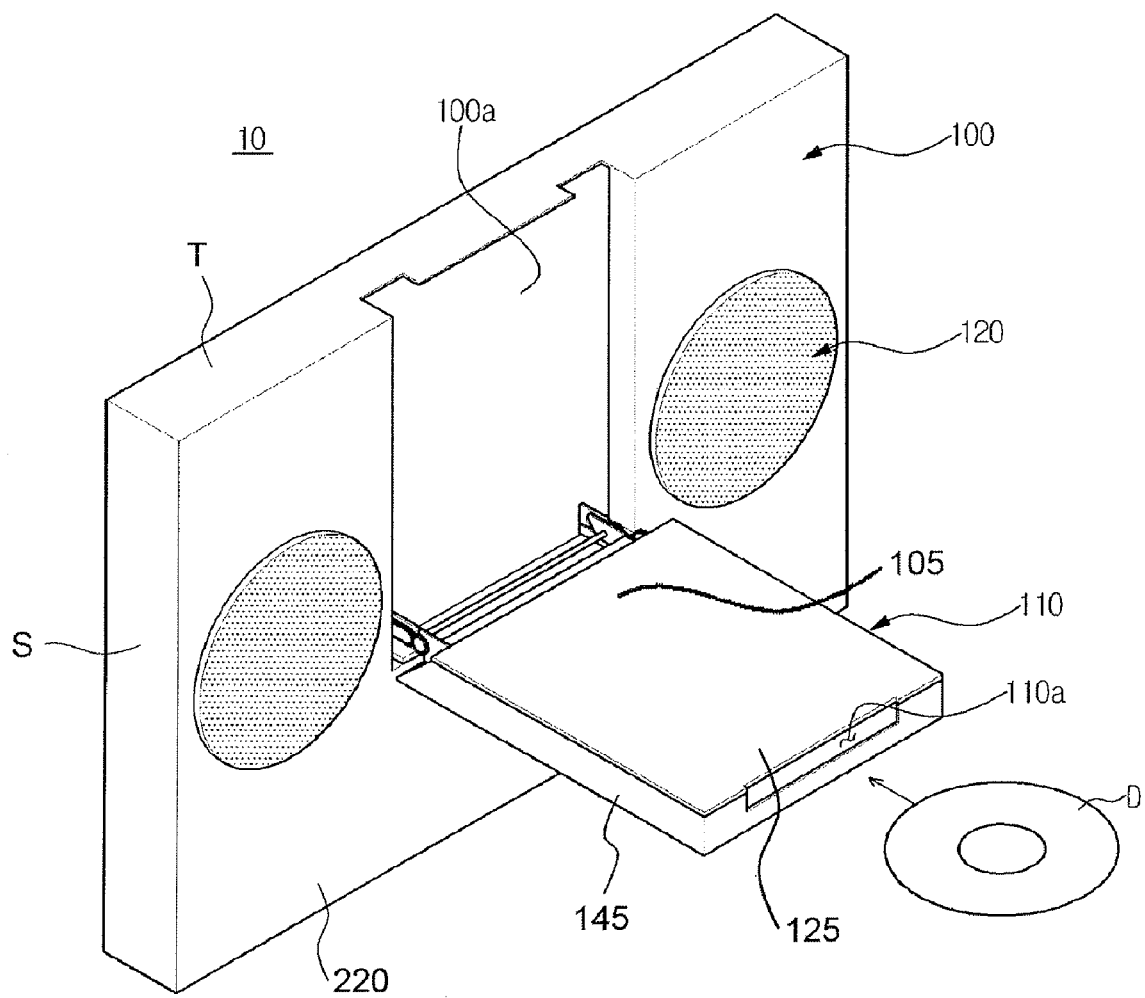
FIG. 3 is a perspective view illustrating a state in which an optical disc drive rotates and protrudes in an optical disc reproducing apparatus according to one embodiment of the present general inventive concept.

As illustrated in FIG. 3, a concave receiving section 100a having a shape to correspond to that of the optical disc drive 110 is provided at the front center at the top T of the body 100 to receive the optical disc drive 110. A pair of speakers 120 are disposed at the front both sides of the body 100 to output sound reproduced from the optical disc D, so that sound information reproduced by the optical disc reproducing apparatus 10 can be output through the speakers 120.

The location of the optical disc drive 110 is not limited to front center near the top T of the body 100. The optical disc drive 110 may be positioned in the middle of the front surface 220 near the center or bottom portion of the body 100. The optical disc drive may also be positioned at or near either side S of the body 100 in order to maximize accessibility and positioning options depending on the location of a television, other connection apparatus, or the size and layout of a room.

Figure 4:
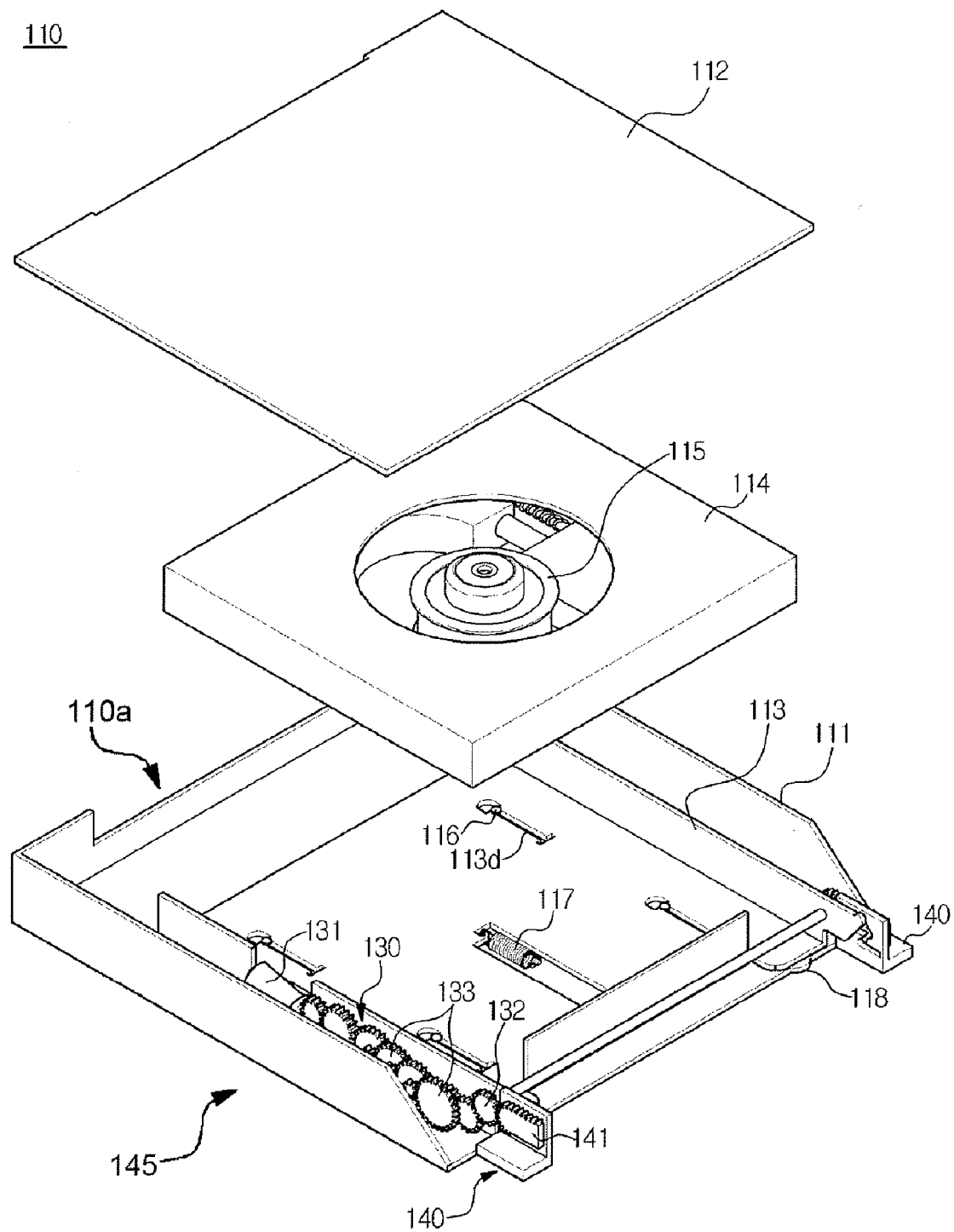
FIG. 4 is an exploded perspective view illustrating an optical disc drive applied to an optical disc reproducing apparatus according to one embodiment of the present general inventive concept.

As illustrated in FIGS. 3 and 4, the optical disc drive 110 may have a rectangular box shape. Further, the optical disc drive 110 may include a drive housing 145 provided at the upper end thereof with a disc insertion port 110a, into which the optical disc D may be inserted, and first and second internal frames 113 and 114 installed in the drive housing 145 to provide a space to install various parts of the optical disc drive 110. A turntable 115 and an optical pickup (not illustrated) are installed in the internal frames. The inserted optical disc D may be positioned on the turntable 115 and is rotated by the turntable 115. The optical pickup reads various pieces of information recorded on the optical disc D seated on the turntable 115. A driving apparatus 130 may be installed at one side of the internal frame to allow the optical disc drive 110 to extend and protrude from the body 100.

The drive housing 145 may include a first housing 111 having the box shape and a second housing 112. The first housing 111 has an opening in one surface thereof and the second housing 112 may cover an upper opening of the first housing 111. The internal frame may include a first internal frame 113 installed in the first housing 111 and a second internal frame 114 that covers the first internal frame 113.

When the optical disc drive 110 is installed below the wall-mount type television 20, the optical disc reproducing apparatus 10 must be spaced apart from the wall-mount type television 20 at a predetermined interval by taking protrusion length of the optical disc drive 110 into consideration when the optical disc drive 110 protrudes upward. Thus, an installation position of the optical disc reproducing apparatus 10 may be limited when positioned below a television or other apparatus. The optical disc drive 110 may also be positioned above or on a side adjacent a television or other image reproducing apparatus for alternative access, when the space provides.

Regarding an instance where the optical disc drive is positioned below a wall-mount television, according to an exemplary embodiment, the optical disc drive 110 may be rotatably installed to the body 100 to protrude from the body 100 as illustrated in FIG. 3. In detail, the lower end 105 of the optical disc drive 110 is rotatably installed to the body 100, so the upper end 125 of the optical disc drive 110 protrudes forward, extending in a perpendicular manner to the front surface 220 of the body 100.

To this end, as illustrated in FIG. 4, the driving apparatus 130 may include a driving motor 131 that generates rotational force, a driving gear 132 rotated by the driving motor 131, and a pair of cam gears 140 installed at both sides of the receiving section 100a of the body 100. The cam gears 140 may have teeth engaged with the driving gear 132 to rotate the optical disc drive 110. The driving gear 132 may be rotated by the rotational force transferred through a plurality of deceleration gears 133 installed to decelerate at one side of the drive housings 111 and 112. The cam gear 140 is provided with a cam unit 141 having teeth engaged with the driving gear 132, so the optical disc drive 110 may protrude from the body 100 or be received into the body 100 while being rotated by interaction between the driving gear 132 and the cam gear 140.

As illustrated in FIGS. 3 and 4, when the optical disc drive 110 protrudes from the body 110, the cam gear 140 and the cam unit 141 may remain within the boundaries of the concave receiving section 100a, while the driving gear 132 may extend external to the boundaries of section 100a. The driving gear 132 may also partially straddle the section 100a and function as an additional hinge to rotate the optical disc drive 110 to open and close in relation to the body 100.

As described above, as the optical disc drive 110 may protrude forward from the body 100 while rotating about the body 100, a space between the optical disc reproducing apparatus 10 and the wall-mount type television 20 is not necessary. Thus, the optical disc reproducing apparatus 10 can be easily installed.

Figure 2:
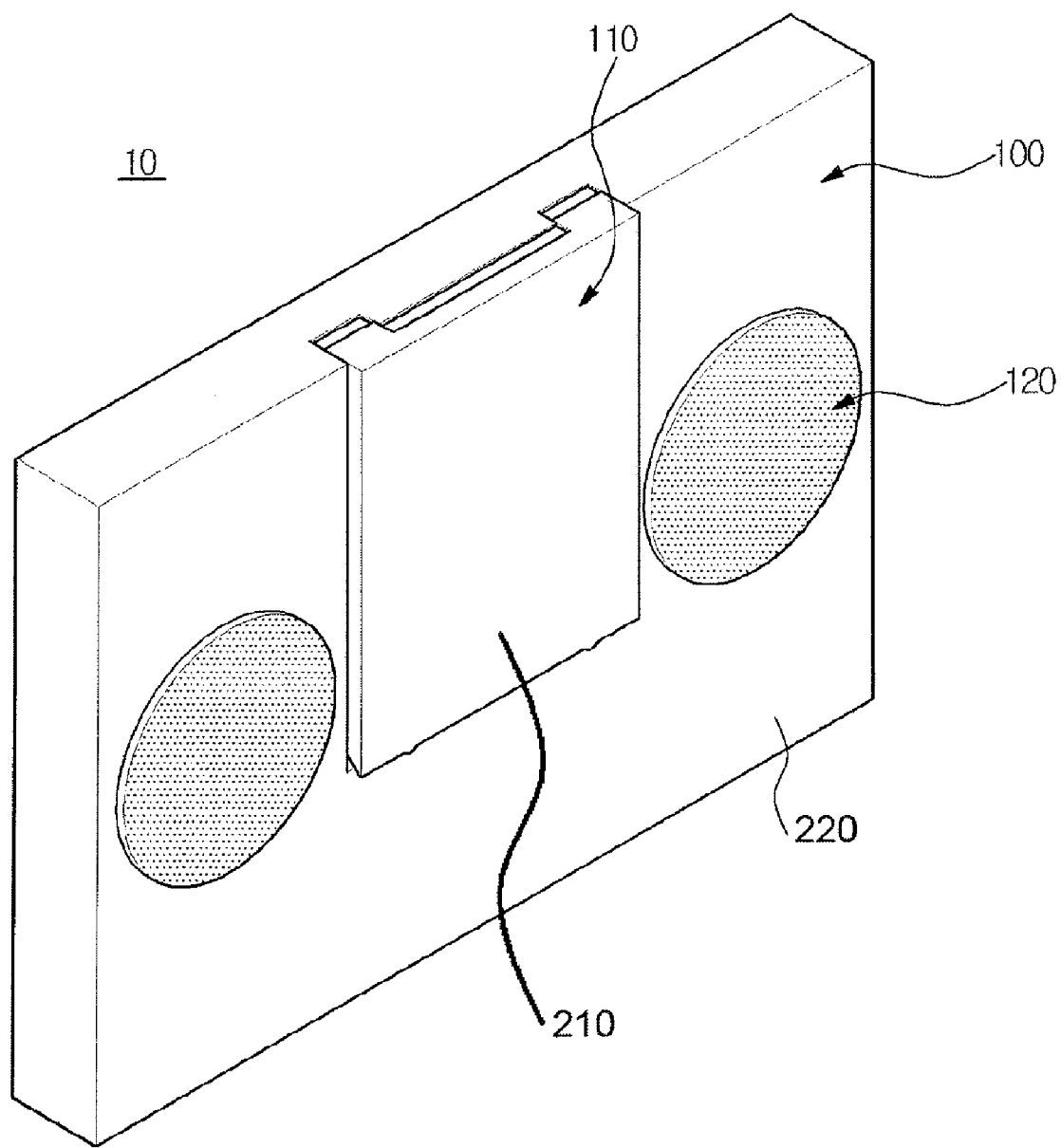
FIG. 2 is a perspective view illustrating a state in which an optical disc drive moves forward in an optical disc reproducing apparatus according to one embodiment of the present general inventive concept.

Further, when the optical disc drive 110 protrudes from the receiving section 100a while rotating about the body 100, rotation of the optical disc drive 110 may be limited because the lower ends of the first and second housings 111 and 112 are supported by the body 100. Thus, according to an exemplary embodiment, the optical disc drive 110 may move forward by a predetermined distance, and partially protrude from the receiving section 100a as illustrated in FIG. 2. Then, the optical disc drive 110 may completely rotate and protrude from the receiving section 100a while rotating about the body 100 to a predetermined position as illustrated in FIG. 3.

Figure 6:
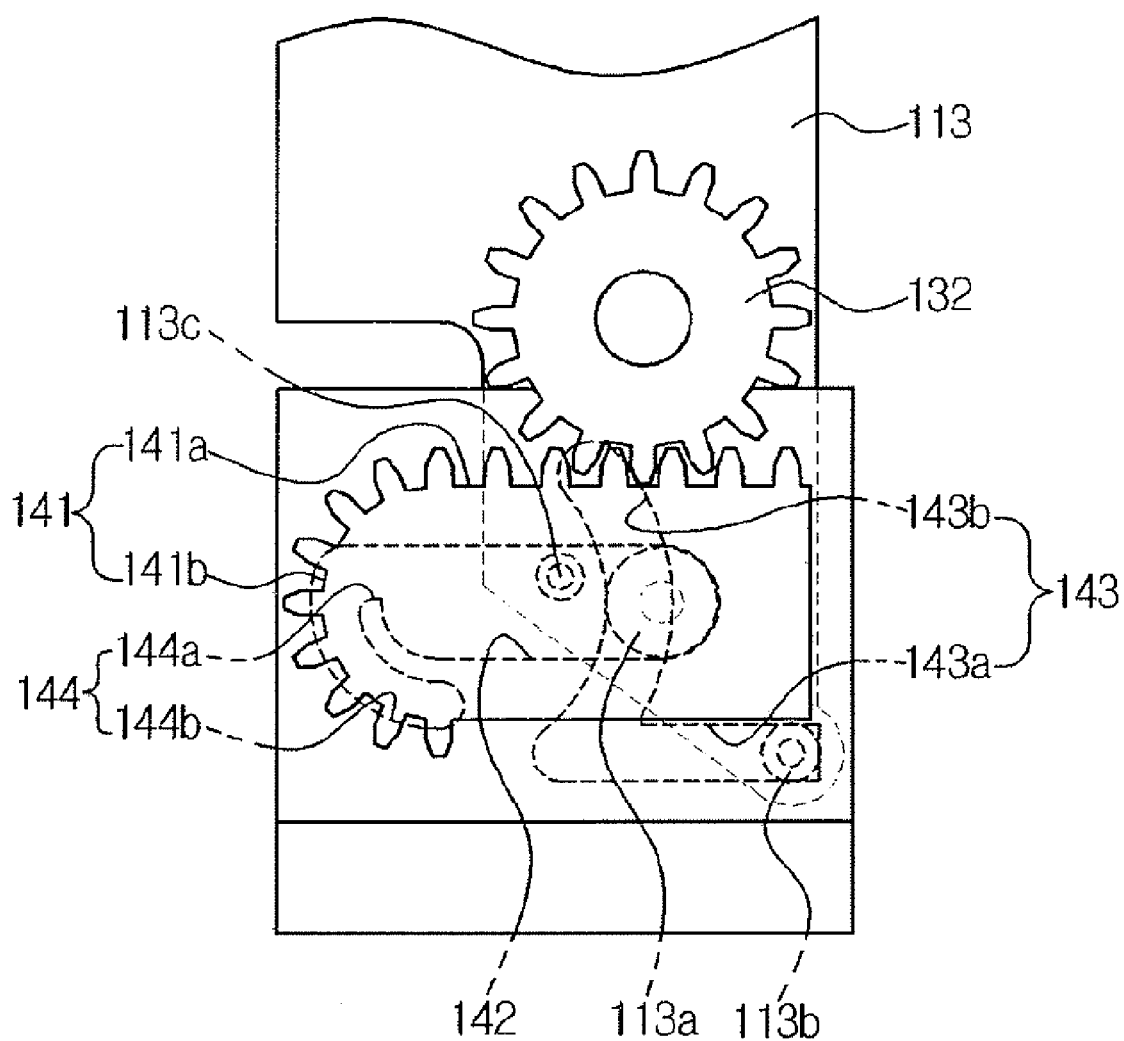
FIGS. 6 to 8 are enlarged views illustrating interaction of an optical disc drive and a cam gear applied to an optical disc reproducing apparatus according to one embodiment of the present general inventive concept.

To this end, as illustrated in FIGS. 4 and 6, the cam unit 141 provided in the cam gear 140 may include a movement section 141a, which extends in the front and rear directions to guide linear movement of the optical disc drive 110, and a rotating section 141b that extends from the front end of the movement section 141a in the form of an arc to guide rotation of the optical disc drive 110.

Figure 5:
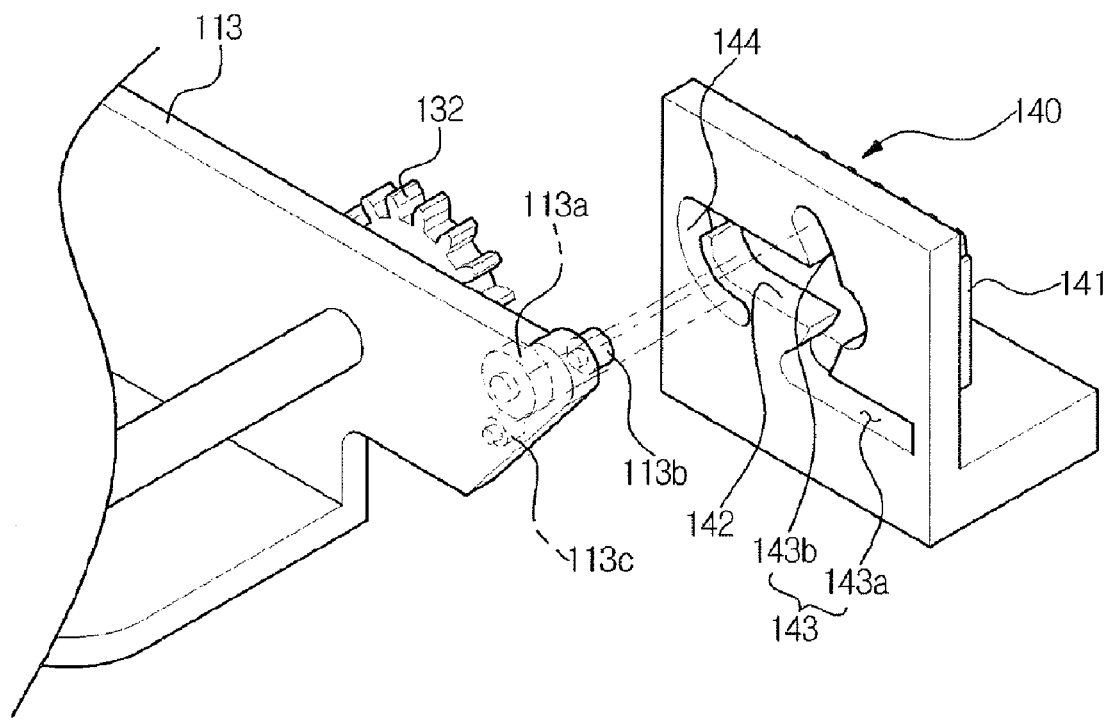
FIG. 5 is an exploded perspective view illustrating an installation state of an optical disc drive and a cam gear applied to an optical disc reproducing apparatus according to one embodiment of the present general inventive concept.

Further, in order to allow the optical disc drive 110 to move back and forth and rotate in the cam gear 140, as illustrated in FIG. 5, a hinge protrusion 113a, which moves back and forth and rotates in the cam gear 140, and guide protrusions 113b and 113c, which guide the movement and rotation of the optical disc drive 110, are formed at both sides of a rear end of the first internal frame 113. Further, the cam gear 140 is formed with a hinge installation hole 142, which extends in front and rear directions and allows the hinge protrusion 113a to move back and forth and rotate therein, and guide holes 143 and 144 that guide linear movement and circumferential movement of the guide protrusions 113b and 113c. According to the present embodiment, the guide protrusions 113b and 113c are formed at both sides of the hinge protrusion 113a, and the guide holes 143 and 144 are formed at the front and rear sides of the hinge installation hole 142, respectively. The hinge installation hole 142 and the guide holes 143 and 144 combine to form a continuous irregularly shaped pattern of holes.

The guide hole 143 may include a movement guide section 143a, which extends in front and rear directions to guide the linear movement of the guide protrusions 113b and 113c, and a rotation guide section 143b that extends from the front end of the movement guide section 143a in circumferential direction to guide the circumferential movement of the guide protrusions 113b and 113c. The guide hole 144 may include a movement guide section 144a, which extends in front and rear directions to guide the linear movement of the guide protrusions 113b and 113c, and a rotation guide section 144b that extends from the front end of the movement guide section 143a in circumferential direction to guide the circumferential movement of the guide protrusions 113b and 113c. Thus, the optical disc drive 110 is installed in the cam gear 140 such that the optical disc drive 110 can rotate only after the optical disc drive 110 has moved in the front direction through the guide protrusions 113b and 113c and the guide holes 143 and 144.

Further, in order to facilitate rotation of the optical disc drive 110 in a state in which the lower ends of the first and second housings 111 and 112 are supported by the body 100, the first and second housings 111 and 112 are movably installed in the first and second internal frames 113 and 114. To this end, as illustrated in FIG. 4, a guide pin 116 is installed at the first housing 111 such that the first and second housings 111 and 112 can move relative to the first and second internal frames 113 and 114, and a guide slot 113d is formed in the first internal frame 113 to guide movement of the guide pin 116. Further, an elastic member 117 having one end installed at the first internal frame 113 and the other end installed at the first housing 111 is provided to return the first and second housings 111 and 112, which have moved forward, to the original position by elastic restoring force thereof. Thus, when the optical disc drive 110 protrudes while being rotated in one direction, the first and second housings 111 and 112 protrude forward after the first and second housings 111 and 112 are supported by the body 100, so that the optical disc drive 110 can be rotated by a predetermined angle through the guide pin 116 and the guide slot 113d.

According to the present embodiment, the first housing 111 can move relative to the first internal frame 113, so the first and second housings 111 and 112 can move relative to the first and second internal frames 113 and 114. Further, a pair of support protrusions 118 are formed at the lower ends of the first housing 111 and supported by the body 100 to reduce friction between the first housing 111 and the body 100.

Hereinafter, an operation of the optical disc reproducing apparatus 10 according to the present general inventive concept having the above configuration will be described in detail with reference to accompanying drawings.

In a state in which the optical disc drive 110 is received in the receiving section 100a as illustrated in FIG. 1, the hinge protrusion 113a is disposed at the rear end of the hinge installation hole 142 as illustrated in FIG. 6, and the circumferential movement of the guide protrusion 113b, which is positioned at the back of the hinge protrusion 113a, is restrained by the movement guide section 143a, so that rotation of the optical disc drive 110 is limited. When the optical disc drive 110 is in the receiving section 100a, the driving gear 132 may be positioned above the cam unit 141.

Figure 7:
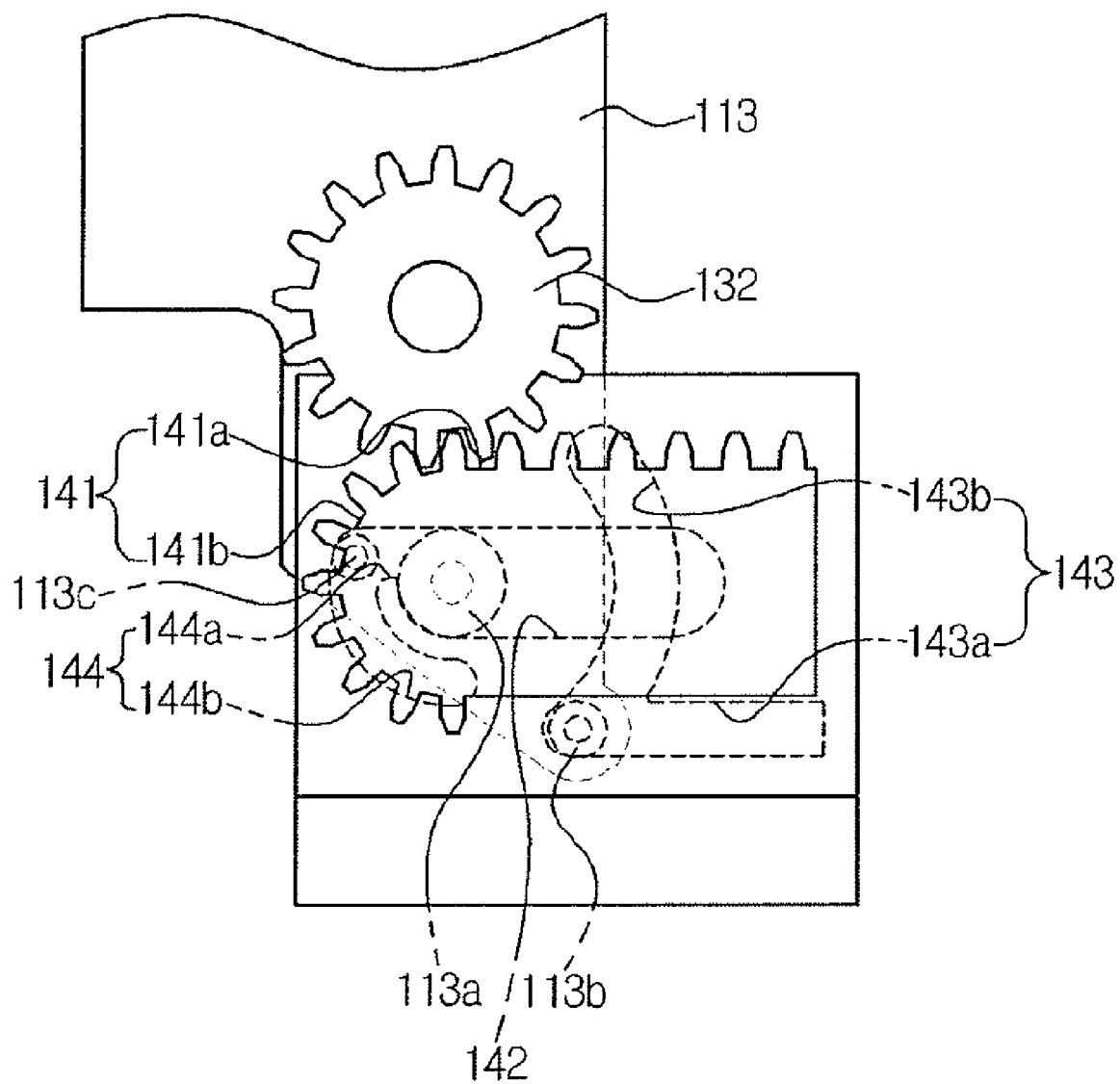

In such a state, if the driving gear 132 is rotated in one direction by the driving motor 131, the driving gear 132 moves linearly along the movement section 141a of the cam unit 141 as illustrated in FIG. 7 and the optical disc drive 110 moves forward together with the driving gear 132, so that a part of the optical disc drive 110 protrudes forward from the receiving section 100a of the body 100 as also illustrated in FIG. 2. Further, the hinge protrusion 113a formed at the first internal frame 113 of the optical disc drive 110 reaches the front end of the hinge installation hole 142 as illustrated in FIG. 7, so that the guide protrusions 113b and 113c can reach the end of the linear movement sections 143a and 144a and can reach the rotation guide sections 143b and 144b of the guide holes 143 and 144 and move in the circumferential direction.

Figure 8:
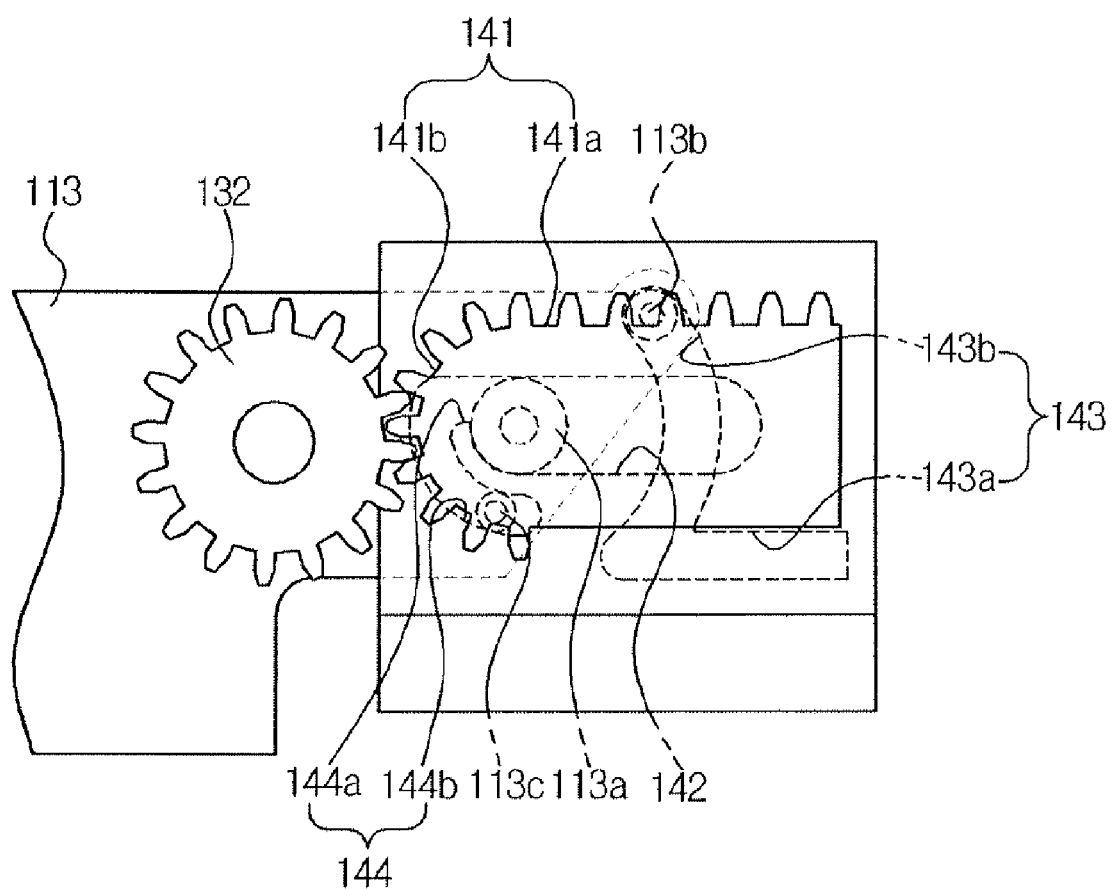

If the driving gear 132 is continuously rotated in one direction, the driving gear 132 moves along the rotation section 141b of the cam unit 141 as illustrated in FIG. 8, so that the optical disc drive 110 is rotated about the hinge protrusion 113a positioned at a front end of the hinge installation hole 142. Further, the guide protrusions 113b and 113c move along the rotation guide sections 143b and 144b of the guide holes 143 and 144, so that the optical disc drive 110 protrudes forward out of the receiving section 100a of the body 100 as illustrated in FIG. 3. The guide holes 143 and 144 are formed with movement guide sections 143a, 144a and rotation guide sections 143b, 144b having a predetermined curvature such that the guide protrusions 113b and 113c may only rotate a fixed distance. This fixed distance allows the optical disc drive 110 to be rotated in a manner in which the disc insertion port 110a may be readily accessed. Such a configuration of the guide holes 143 and 144 prevents the guide protrusions from rotating more than a fixed length and over-rotation of the optical disc drive. In such a state, the disc insertion port 110a formed in the upper end of the optical disc drive 110 is positioned forward, so that the optical disc D can be easily inserted into or withdrawn from the disc insertion port 110a regardless of an interval between the wall-mount type television 20 and the optical disc reproducing apparatus 10.

After the optical disc D is completely inserted into the disc insertion port 110a, the driving gear 132 is rotated in reverse direction by the driving motor 131 or by manual operation, so that the optical disc drive 110 is received in the receiving section 100a by operating in a sequence reverse to that of the above operation. When retracted, operating in reverse, the optical disc drive may be returned to the forward protruded configuration illustrated in FIG. 2, before the motor 131 moves the optical disc drive 110 backward with the driving gear 132, so that the top surface 210 of the optical disc drive will again become flush with the front surface 220 of the body 100.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An optical disc reproducing apparatus comprising:
   a body installed at a wall; and
   an optical disc drive rotatably installed to the body to protrude from the body; and
   a driving apparatus that rotates the optical disc drive, the driving apparatus comprising:
      a driving motor that generates rotational force;
      a driving gear rotated by the driving motor; and
      a cam gear installed at the body to rotate the optical disc drive while being engaged with the driving gear, the cam gear including a cam unit having teeth engaged with the driving gear to guide movement of the optical disc drive, the cam unit further comprising:
         a movement section that extends in front and rear directions to guide linear movement of the optical disc drive; and
         a rotating section that extends in a form of an arc to guide rotation of the optical disc drive.

2. The optical disc reproducing apparatus of claim 1, wherein the optical disc drive comprises:
   a hinge protrusion that moves back and forth and rotates in the cam gear; and
   guide protrusions that guide the rotation of the optical disc drive, wherein the cam gear comprises:
      a hinge installation hole that extends in front and rear directions and allows the hinge protrusion to move back and forth and rotate therein; and
      guide holes that extend from the hinge installation hole in circumferential direction to guide linear movement and circumferential movement of the guide protrusions.

3. The optical disc reproducing apparatus of claim 2, wherein each guide hole comprises:
   a movement guide section that extends in front and rear directions; and
   a rotation guide section that extends from a front end of the movement guide section in circumferential direction.

4. The optical disc reproducing apparatus of claim 2 wherein the guide protrusions are provided at both sides of the hinge protrusion as a pair, and the guide holes are formed at front and rear sides of the hinge installation hole, respectively.

5. The optical disc reproducing apparatus of claim 1, further comprising a speaker installed at the body to output sound reproduced from an optical disc.

6. The optical disc reproducing apparatus of claim 1, wherein the optical disc drive comprises a drive housing forming an external appearance and the body is provided with a concave receiving section that has a shape to correspond to the drive housing to receive the optical disc drive.

7. The optical disc reproducing apparatus of claim 6, wherein the optical disc drive further comprises:
   an internal frame in which internal parts are installed and the drive housing is movably installed;
   a guide pin installed at the drive housing to allow the drive housing to move relative to the internal frame;
   a guide slot provided in the internal frame to guide movement of the guide pin; and
   an elastic member having a first end installed at the internal frame and a second end installed at the drive housing.

8. The optical disc reproducing apparatus of claim 6, wherein a part of the optical disc drive protrudes forward from the receiving section of the body before the optical disc drive is rotated.

9. An optical disc reproducing apparatus comprising:
a body installed at a wall;
an optical disc drive rotatably and movably installed to the body while protruding from the body such that the optical disc drive rotates after moving forward by a predetermined distance; and
a driving apparatus that allows the optical disc drive to move back and forth while rotating the optical disc drive, the driving apparatus comprising:
a driving motor to generate a rotational force;
a driving gear rotated by the driving motor; and
a cam gear installed at the body to guide linear movement and rotation of the optical disc drive while being engaged with the driving gear.

10. The optical disc reproducing apparatus of claim 9, wherein the cam gear comprises a cam unit having teeth engaged with the driving gear to guide movement of the optical disc drive,
and wherein the cam unit comprises:
a movement section that extends in front and rear directions to guide linear movement of the optical disc drive; and
a rotating section that extends in a form of an arc to guide the rotation of the optical disc drive.

11. The optical disc reproducing apparatus of claim 10, wherein the optical disc drive comprises:
a hinge protrusion movably and rotatably installed to the cam gear; and
guide protrusions that guide the linear movement and rotation of the optical disc drive,
wherein the cam gear comprises:
a hinge installation hole that extends in front and rear directions and allows the hinge protrusion to move back and forth and rotate therein; and
guide holes that extend from the hinge installation hole to guide linear movement and circumferential movement of the guide protrusions.

12. A mountable optical disc drive apparatus comprising:
a body having a front surface;
a concave receiving section disposed in the front surface of the body and having a cam gear installed at a surface of the concave receiving section;
an optical disc drive rotatably coupled to the body via the concave receiving section such that the optical disc drive rotates about the body to a predetermined position;
a cam unit installed in the concave receiving section having at least one movement guide section and rotation guide section; and
a frame coupled to the cam gear such that the frame moves along a path of the movement guide section and the rotation guide section.

13. The mountable optical disc drive apparatus of claim 12, wherein the frame includes a hinge protrusion and a plurality of guide protrusions mounted to the frame.

14. A method of operating an optical disc drive apparatus, comprising:
mounting a body having a front surface on a wall or vertical mounting apparatus, the body including an optical disc drive apparatus;
partially protruding the optical disc drive apparatus beyond the front surface in a front direction from a concave receiving section in the body; and
rotating the optical disc drive apparatus only after the optical disc drive has moved in the front direction, the optical disc drive apparatus being rotated by a cam unit having at least one movement guide section and at least one rotation guide section.

* * * * *